United States Patent
Oswald et al.

(10) Patent No.: US 9,947,356 B1
(45) Date of Patent: Apr. 17, 2018

(54) CALIBRATION SPIRAL TO IMPROVE GUIDE SPIRAL PLACEMENT

(71) Applicant: KABUSHIKI KAISHA TOSHIBA, Tokyo (JP)

(72) Inventors: Richard Oswald, San Jose, CA (US); Gabor Szita, Mountain View, CA (US); Li Zhang, Fremont, CA (US)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/454,886

(22) Filed: Mar. 9, 2017

(51) Int. Cl.
  *G11B 5/09* (2006.01)
  *G11B 5/596* (2006.01)

(52) U.S. Cl.
  CPC ...... *G11B 5/59661* (2013.01); *G11B 5/59666* (2013.01)

(58) Field of Classification Search
  None
  See application file for complete search history.

(56) References Cited

U.S. PATENT DOCUMENTS

| | | | | |
|---|---|---|---|---|
| 7,019,937 B1 * | 3/2006 | Liikanen | ............ | G11B 5/59661 360/75 |
| 7,145,744 B1 * | 12/2006 | Clawson | ............ | G11B 5/59655 360/51 |
| 7,433,143 B1 * | 10/2008 | Ying | ............ | G11B 5/012 360/48 |
| 7,852,592 B1 * | 12/2010 | Liang | ............ | G11B 5/59627 360/31 |
| 8,634,154 B1 | 1/2014 | Rigney et al. | | |
| 8,929,021 B1 | 1/2015 | Liang et al. | | |
| 9,047,901 B1 | 6/2015 | Nie et al. | | |
| 9,064,517 B1 * | 6/2015 | Neos | ............ | G11B 5/5526 |

* cited by examiner

*Primary Examiner* — K. Wong
(74) *Attorney, Agent, or Firm* — Patterson & Sheridan, LLP (57) ABSTRACT

A method of writing servo spirals for spiral-based self-servo writing includes determining control parameters for controlling movement of a write head between a first and a second disk radial location at a first velocity, writing a first spiral while controlling the movement of the write head between the first and the second disk radial location at the first velocity according to the determined control parameters, writing a second spiral while controlling movement of the write head between the first and the second disk radial location at a second velocity that is different from the first velocity, based on timing and location information from the first spiral, and writing a third spiral while controlling movement of the write head between the first and the second disk radial location at the first velocity according to the determined control parameters and based on timing and location information from the second spiral.

20 Claims, 9 Drawing Sheets

CALIBRATION SPIRAL TO IMPROVE GUIDE SPIRAL PLACEMENT

BACKGROUND

In a typical hard disk drive (HDD), servo sectors on the disk are used to provide position information about the location of a magnetic head over a disk surface. A common approach for writing such servo information on one or more disk surfaces in an HDD is referred to as spiral-based self-servo writing, or spiral-based SSW. According to this approach, multiple spiral-shaped servo information patterns (or "servo spirals") are written on at least one disk surface prior to the SSW process. During the SSW process, a magnetic head of the HDD is positioned relative to a disk surface based on timing and position information in the servo spirals, so that the final servo information (the servo sectors) can be written on the disk surface by the magnetic head.

For an error-free and robust SSW process, the servo spirals used should be precisely written on the disk surface with a predetermined and constant slope. Such servo spirals may be written on the disk surface with an external media writer before assembly of the disk drive, or with a servo writing machine that uses an external precision actuator to position the disk drive actuator with a mechanical push pin through an opening in the disk drive housing. In either case, setup and use of such external equipment for each individual HDD is time-consuming and expensive in the context of high-volume manufacturing.

In light of this, in-drive spiral-writing schemes have been employed, in which an HDD itself writes servo spirals prior to performing the SSW process. For example, as discussed in U.S. patent application Ser. No. 14/675,458, entitled "Writing Spirals with Accurate Slope on a Disk Drive Media," filed on Mar. 21, 2015, the entire contents of which are incorporated by reference herein, a set of coarsely positioned spirals may be written by the HDD while the actuator is moved across a disk surface by applying a suitable open-loop voltage profile, or by using velocity control that is based on back electromotive force (back-EMF) feedback. More precisely positioned sets of spirals can then be written in one or more subsequent closed-loop spiral-writing processes, by demodulating signals from the more coarsely positioned sets of spirals. For example, a set of coarse servos spirals, a set of fine servo spirals, and a set of final servos spirals may be progressively written by the HDD itself in this way. The servo sectors are then written on a disk surface by positioning the magnetic head based on the final, most accurately positioned set of servo spirals.

SUMMARY

A hard disk drive (HDD) is configured to carry out spiral-based self-servo writing. According to an embodiment, a method of writing servo spirals while carrying out the spiral-based self-servo writing includes the steps of determining control parameters for controlling movement of a write head between a first radial location on the disk surface and a second radial location on the disk surface at a first velocity, writing a first spiral while controlling movement of the write head between the first radial location on the disk surface and the second radial location on the disk surface at the first velocity according to the determined control parameters, writing a second spiral while controlling movement of the write head between the first radial location on the disk surface and the second radial location on the disk surface at a second velocity that is different from the first velocity, based on timing and location information from the first spiral, and writing a third spiral while controlling movement of the write head between the first radial location on the disk surface and the second radial location on the disk surface at the first velocity according to the determined control parameters and based on timing and location information from the second spiral.

A data storage device according to an embodiment includes a rotatable disk with a writable surface, and a controller. The controller is configured to determine control parameters for controlling movement of a write head between a first radial location on the disk surface and a second radial location on the disk surface at a first velocity, write a first spiral while controlling movement of the write head between the first radial location on the disk surface and the second radial location on the disk surface at the first velocity according to the determined control parameters, write a second spiral while controlling movement of the write head between the first radial location on the disk surface and the second radial location on the disk surface at a second velocity that is less than the first velocity, based on timing and location information from the first spiral, and write a third spiral while controlling movement of the write head between the first radial location on the disk surface and the second radial location on the disk surface at the first velocity according to the determined control parameters and based on timing and location information from the second spiral.

Another embodiment provides a rotatable disk for a data storage device that has a data recording area and an optional unused recording area. The data recording area extends from an inner diameter location to an outer diameter location, and the unused recording area is to the outside of the outer diameter location and includes portions of spirals having at least four substantially different slopes written thereon.

BRIEF DESCRIPTION OF THE DRAWINGS

So that the manner in which the above recited features of embodiments of the invention can be understood in detail, a more particular description of embodiments of the invention, briefly summarized above, may be had by reference to the appended drawings. It is to be noted, however, that the appended drawings illustrate only typical embodiments of this invention and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Figure 1:
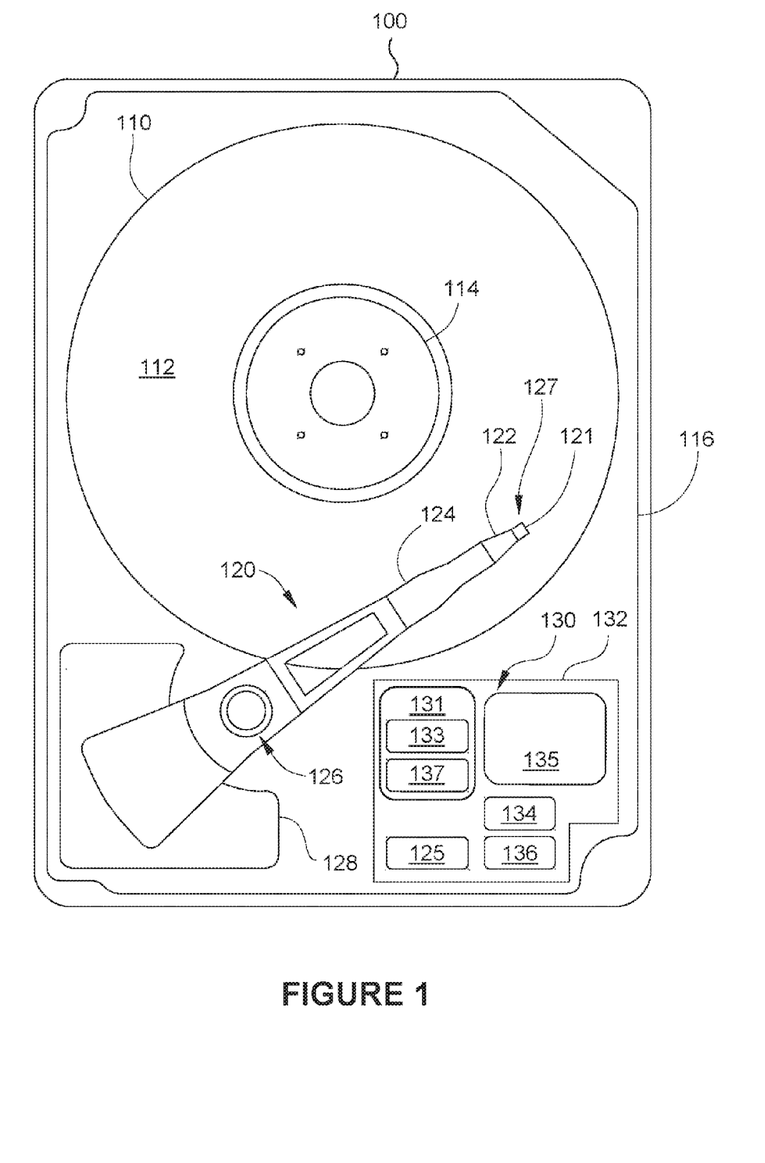
FIG. 1 is a schematic view of an exemplary hard disk drive, according to one embodiment.

FIG. 1 is a schematic view of an exemplary hard disk drive, according to one embodiment. For clarity, hard disk drive (HDD) 100 is illustrated without a top cover. HDD 100 includes a single storage disk 110 that is rotated by a spindle motor 114 and includes a plurality of concentric data storage tracks are disposed on a single surface 112 of storage disk 110. Spindle motor 114 is mounted on a base plate 116. An actuator arm assembly 120 is also mounted on base plate 116, and has a slider 121 mounted on a flexure arm 122 with a magnetic read/write head 127 that reads data from and writes data to the data storage tracks. Flexure arm 122 is attached to an actuator arm 124 that rotates about a bearing assembly 126. Voice coil motor 128 moves slider 121 relative to storage disk 110, thereby positioning read/write head 127 over a desired concentric data storage track. Spindle motor 114, read/write head 127, and voice coil motor 128 are coupled to electronic circuits 130, which are mounted on a printed circuit board 132.

In the embodiment illustrated in FIG. 1, HDD 100 includes a single storage disk 110 that is rotated by a spindle motor 114 and includes a plurality of concentric data storage tracks are disposed on a single surface 112 of storage disk 110. Alternatively, storage disk 110 includes two surfaces and/or HDD 100 includes multiple storage disks 110. In such embodiments, various embodiments as described herein can be implemented on a single surface of storage disk(s) 110.

Electronic circuits 130 include a read/write channel 137, a microprocessor-based controller (hereinafter referred to as "controller") 133, and a random-access memory (RAM) 134 (which may be a dynamic RAM and is used as a data buffer). In some embodiments, electronic circuits 130 may further include a flash memory device 135 and a flash manager device 136, for example when HDD 100 is configured as a hybrid drive. In some embodiments, read channel 137 and controller 133 are included in a single chip, such as a system-on-chip 131. In some embodiments, HDD 100 may further include a motor-driver chip 125 that accepts commands from controller 133 and drives both spindle motor 114 and voice coil motor 128. Read/write channel 137 communicates with the read/write head 127 via a preamplifier (not shown) that may be mounted on a flex-cable that is itself mounted on base plate 116 or actuator arm 120, or both.

When data are transferred to or from storage disk 110, actuator arm assembly 120 sweeps an arc between the inner diameter (ID) and outer diameter (OD) of storage disk 110. Actuator arm assembly 120 accelerates in one angular direction when current is passed in one direction through the voice coil of voice coil motor 128 and accelerates in an opposite direction when the current is reversed, thereby allowing control of the position of actuator arm assembly 120 and attached read/write head 127 with respect to storage disk 110. Voice coil motor 128 is coupled with a servo system known in the art that uses the positioning data read from servo wedges on storage disk 110 by read/write head 127 to determine the position of read/write head 127 over a specific data storage track. The servo system determines an appropriate current to drive through the voice coil of voice coil motor 128, and drives said current using a current driver and associated circuitry.

In order for HDD 100 to perform servo self-write (SSW) and write the above-described servo wedges on storage disk 110 with the necessary precision for proper operation of HDD 100, position and timing information are provided to the disk drive servo system of HDD 100. The position and timing information that enable the internal servo system of HDD 100 to perform SSW is typically in the form of reference spiral tracks or "servo spirals" written on storage disk 110. One embodiment of such servo spirals is illustrated in FIG. 2.

Figure 2:
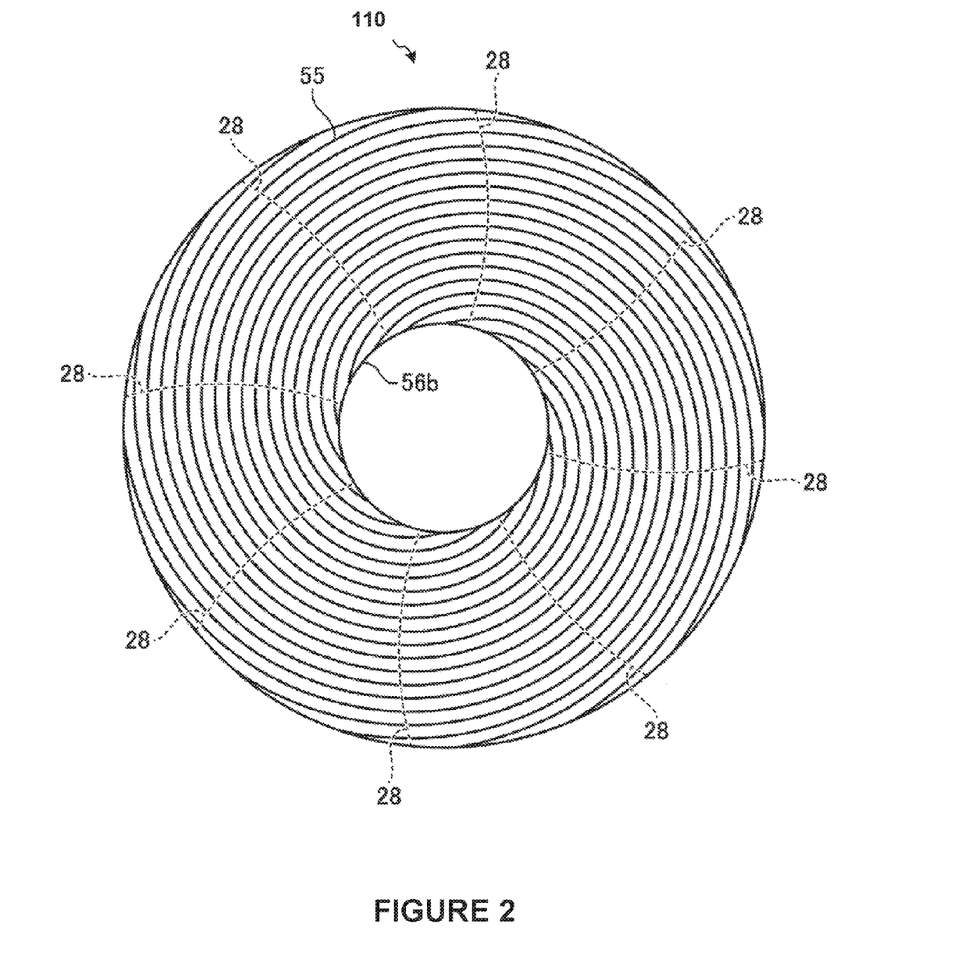
FIG. 2 illustrates a storage disk of the hard disk drive of FIG. 1 after undergoing servo self-write.

FIG. 2 illustrates a storage disk 110 of the hard disk drive of FIG. 1 after undergoing a SSW. As illustrated by solid lines in FIG. 2, servo spirals 55 are written on storage disk 110 in a spiral shape. Servo spirals 55 are formed by periodically and repeatedly recording a burst pattern and a synchronization pattern at a substantially constant speed from the ID to the OD of storage disk 110. Once servo spirals 55 are written on storage disk 110, servo wedges may be recorded on storage disk 110 in regions 28 with reference to servo spirals 55.

According to embodiments, before servo spirals 55 (also referred to herein as final spirals) are written on storage disk 110, an initial spiral, a calibration spiral, and first and second sets of reference spirals (hereinafter referred to as "first reference spirals" and "second reference spirals"), are written on storage disk 110. The initial spiral, the first reference spirals, the second reference spirals, and servo spirals 55 are each formed by periodically and repeatedly recording a burst pattern and a synchronization pattern at a substantially constant speed from the ID to the OD (or from the OD to the ID) of storage disk 110. In one embodiment, the calibration spiral is also formed by periodically and repeatedly recording a burst pattern and a synchronization pattern at a substantially constant speed from the ID to the OD of storage disk 110. In another embodiment, the calibration spiral is recorded at a fixed frequency without the burst pattern and the synchronization pattern. In either case, the timing and location information is obtained from signals generated at intersections of the initial spiral and the calibration spiral. In some embodiments, the first reference spirals are coarse guide spirals and the second reference spirals are fine guide spirals. The coarse guide spirals are used as a position and timing reference when writing the fine guide spirals, which are used as a position and timing reference when writing servo spirals 55, which are used as a position and timing reference when writing servo sectors.

Figure 3:
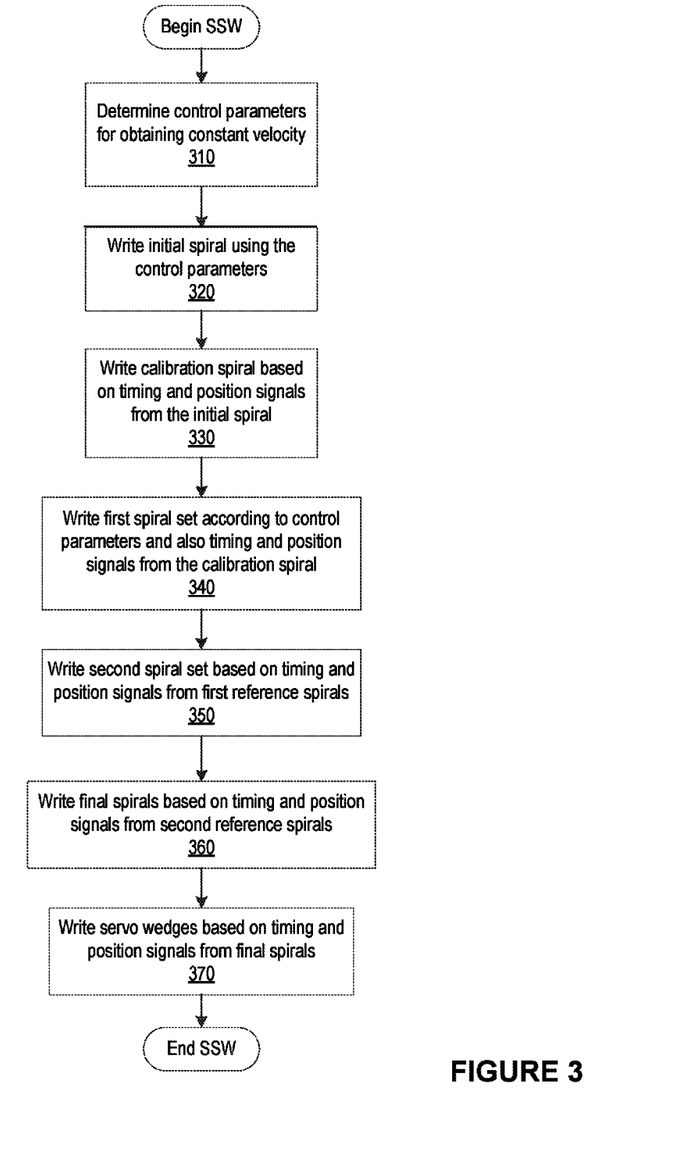
FIG. 3 sets forth a flowchart of method steps of writing servo spirals on a disk surface, according to an embodiment.

FIG. 3 sets forth a flowchart of method steps of writing servo spirals on a disk surface, according to an embodiment. FIGS. 4A to 4E each illustrate a state of a surface of the storage disk after each step of writing servo spiral or spirals on the disk surface. In each of FIGS. 4A to 4E, the vertical axis represents the circumferential direction of storage disk 110 and the horizontal axis represents the radial direction of storage disk 110.

Prior to writing any spiral, controller 133 at step 310 determines control parameters for moving read/write head 127 across the disk surface at a substantially constant initial target velocity, V1, in accordance with the technique described in U.S. patent application Ser. No. 14/675,458. As described therein, the control parameters are tuned voltages that are to be applied to actuator arm assembly 120 as read/write head 127 moves across the disk surface to cause read/write head 127 to sweep across the disk surface at a substantially constant velocity equal to the initial target velocity, V1.

Figure 4A:
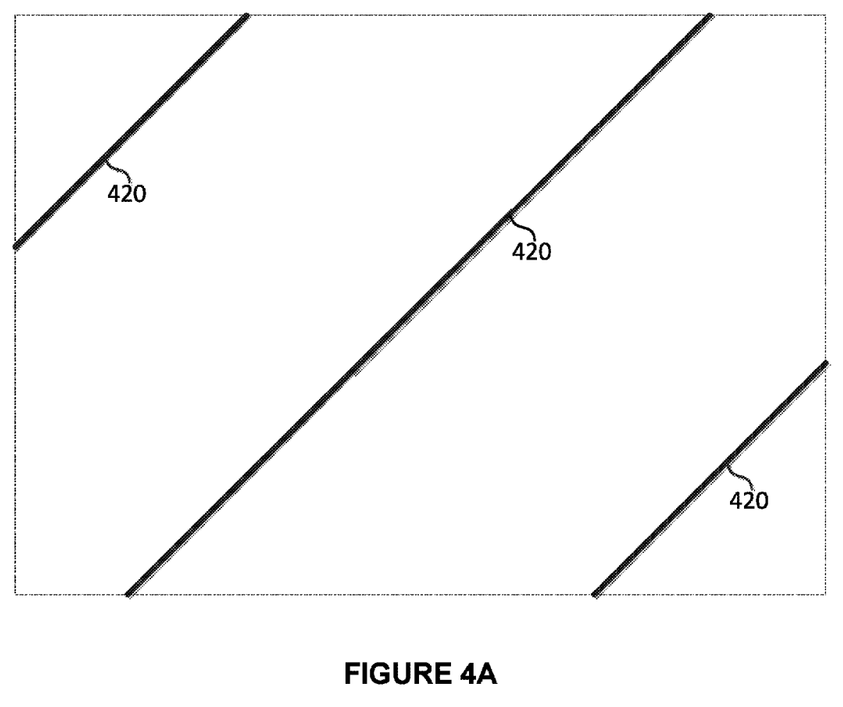
FIGS. 4A to 4E each schematically illustrate a state of a surface of the storage disk onto which spirals are being written.

Then, at step 320, controller 133 applies the control parameters to move read/write head 127 from the ID to the OD at a substantially constant velocity equal to V1, and as read/write head 127 is moving, controls read/write head 127 to write an initial spiral 420 on the disk surface. FIG. 4A is a schematic illustration of a portion of the disk surface onto which initial spiral 420 has been written.

Figure 4B:
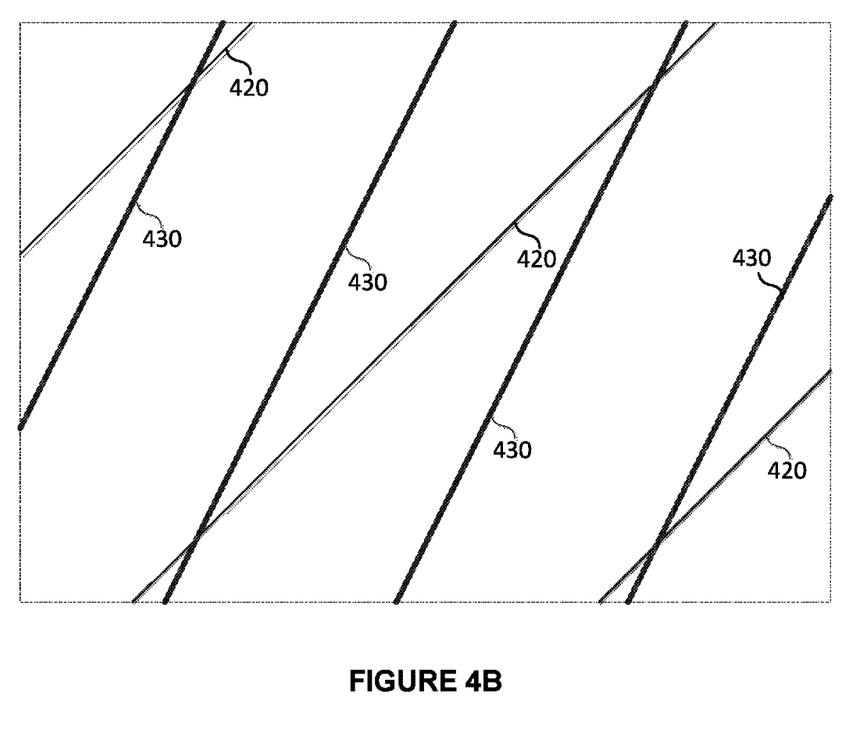

At step 330, controller 133 controls movement of read/write head 127 from the ID to the OD with reference to initial spiral 420 (in particular timing and position signals generated by read/write head 127 as a result reading burst patterns and synchronization patterns of initial spiral 420) and at a substantially constant velocity equal to V0, where V0 is different from V1, and as read/write head 127 is moving, controls read/write head 127 to write a calibration spiral 430 on the disk surface. In one embodiment, V1 is an integer multiple of V0, e.g., 2*V0 or 3*V0. In other embodiments, V0 is an integer multiple of V1, e.g., 2*V1 or 3*V1. FIG. 4B is a schematic illustration of a portion of the disk surface onto which initial spiral 420 and calibration spiral 430 have been written.

Figure 4C:
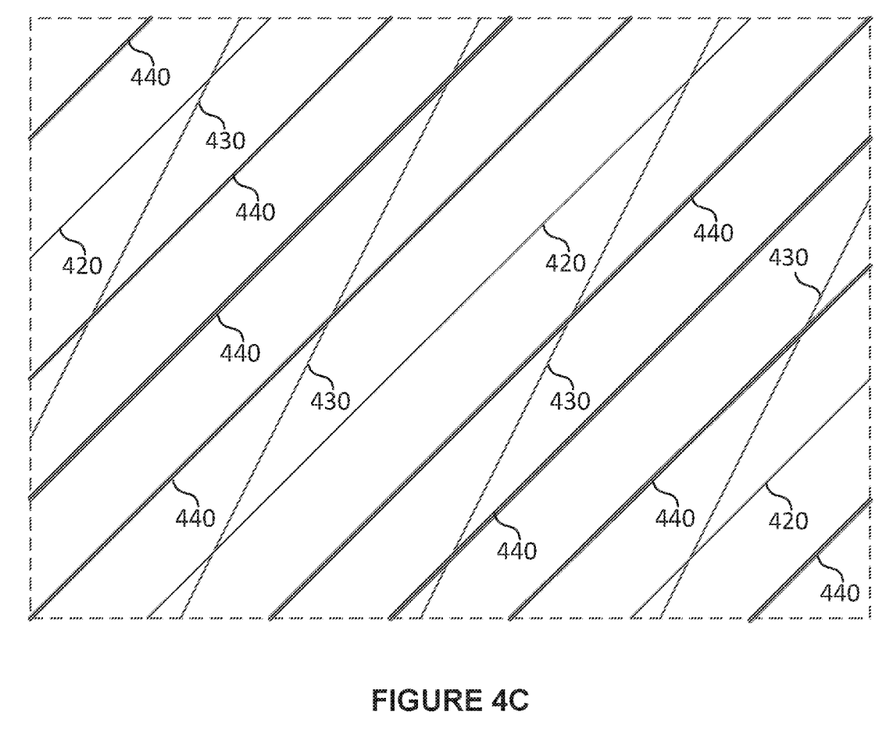

At step 340, controller 133 applies the control parameters as initial control parameters for moving read/write head 127 from the ID to the OD at a substantially constant velocity equal to V1. Each time read/write head 127 crosses an intersection of initial spiral 420 and calibration spiral 430, controller 133 executes closed-loop control to correct for any deviations in the current velocity of read/write head 127 from V1. As read/write head 127 is moved in this manner, controller 133 writes a first reference spiral. This process is repeated multiple times to write a predetermined number of evenly spaced first reference spirals. FIG. 4C is a schematic illustration of a portion of the disk surface onto which initial spiral 420, calibration spiral 430, and first reference spirals 440 have been written.

Figure 4D:
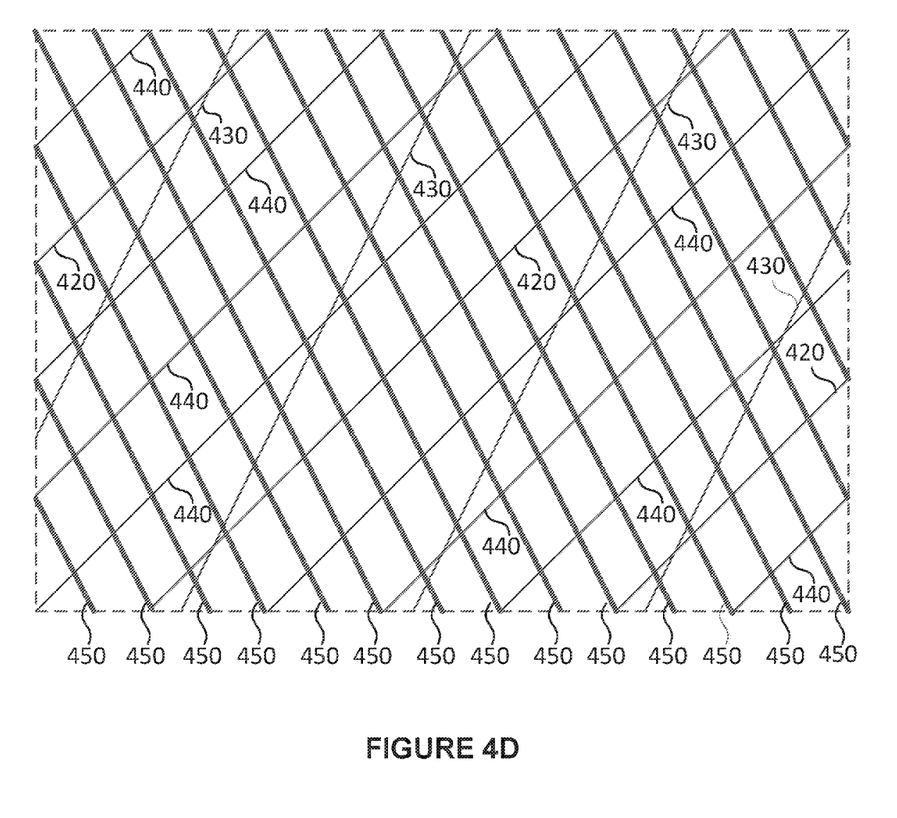

At step 350, controller 133 controls movement of read/write head 127 from the OD to the ID with reference to the first reference spirals and at a substantially constant velocity equal to V2, where V2<V1. Each time read/write head 127 crosses a first reference spiral, controller 133 executes closed-loop control to correct for any deviations in the current velocity of read/write head 127 from V2, based on timing and position signals generated by read/write head 127. As read/write head 127 is moved in this manner, controller 133 writes a second reference spiral. This process is repeated multiple times to write a predetermined number of evenly spaced second reference spirals. In one embodiment, a larger number of second reference spirals is written relative to the first reference spirals. FIG. 4D is a schematic illustration of a portion of the disk surface onto which initial spiral 420, calibration spiral 430, first reference spirals 440, and second reference spirals 450 have been written.

Figure 4E:
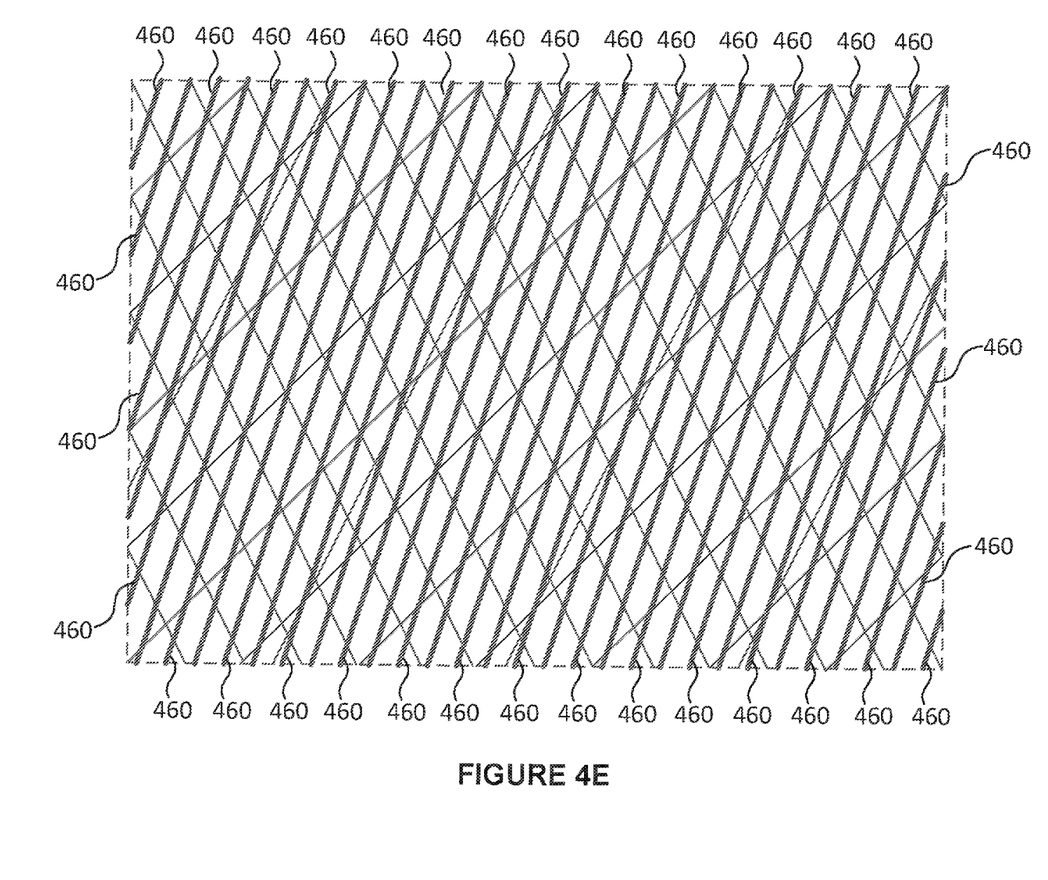

At step 360, controller 133 controls movement of read/write head 127 from the ID to the OD with reference to the second reference spirals and at a substantially constant velocity equal to V3, where V3<V2. Each time read/write head 127 crosses a second reference spiral, controller 133 executes closed-loop control to correct for any deviations in the current velocity of read/write head 127 from V3, based on timing and position signals generated by the read/write head 127. As read/write head 127 is moved in this manner, controller 133 writes a final spiral. This process is repeated multiple times to write a predetermined number of evenly spaced final spirals. In one embodiment, a larger number of final spirals are written relative to the second reference spirals. FIG. 4E is a schematic illustration of a portion of the disk surface onto which initial spiral 420, calibration spiral 430, first reference spirals 440, second reference spirals 450, and final spirals 460 have been written.

At step 370, controller 133 executes writing of servo wedges while moving read/write head 127 with reference to the final spirals.

Figure 5:
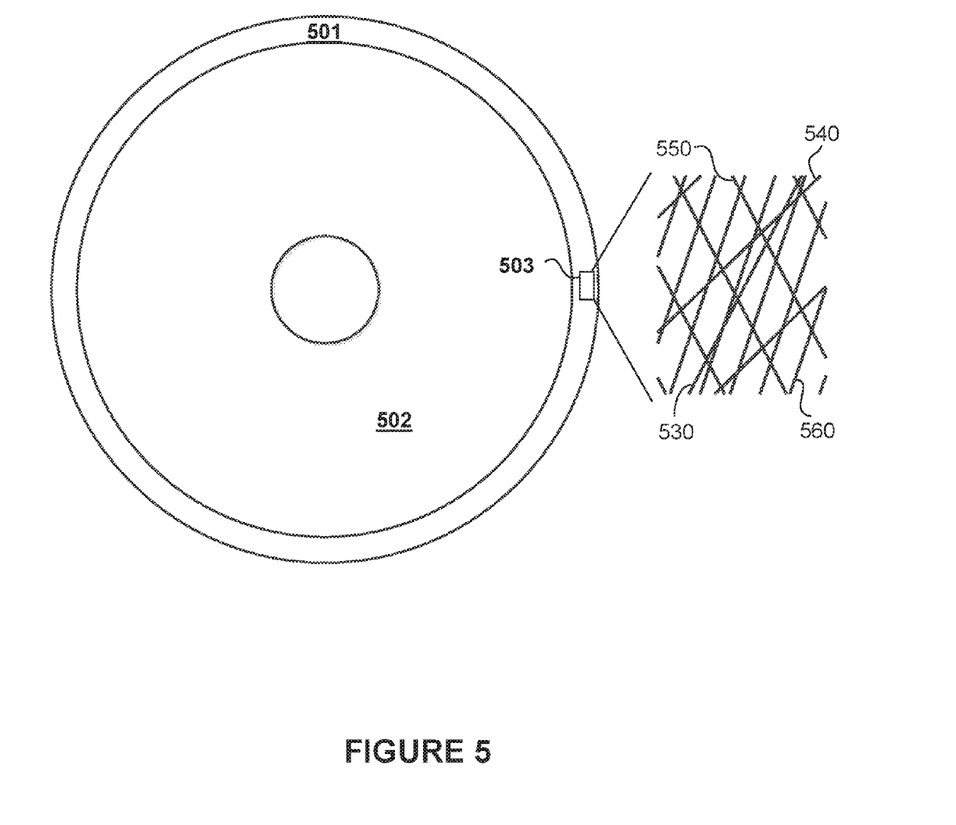
FIG. 5 is schematic illustration of an outer periphery of a storage disk that has undergone a servo self-write process according to an embodiment.

FIG. 5 is schematic illustration of an outer periphery of storage disk 110' that has undergone a servo self-write process according to an embodiment. In the example illustrated herein, SSW is carried out on a single surface of storage disk 110' such that each of initial spiral 420, calibration spiral 430, first reference spirals 440, second reference spirals 450, and final spirals 460 are written on that surface. Storage disk 110' has a data recording area 501 between the ID and the OD and an unused recording area 502. As illustrated in an expanded view of an area 503 of unused recording area 502, the unused recording area 502 has written thereon a portion 520 of initial spiral 420, a portion 530 of calibration spiral 430, a portion 540 of first reference spirals 440, a portion 550 of second reference spirals 450, and a portion 560 of final spiral 460. The slope of portion 530 is different from slopes of all the other portions because it was written while read/write head 127 was moving at a velocity different from the others. The slope of portion 520 is the same as the slope of portion 540 because both portions were written while read/write head 127 was moving at the same velocity (i.e., V1), but they are different from the slopes of other portions. In addition, the slope of portion 520 and the slope of portion 540 are flatter than the slope of portion 530 because read/write head 127 was moving at a higher velocity during the writing thereof than during the writing of portion 530 (i.e., V1>V0). The slope of portion 550 is steeper than the slope of any portion 520, 540 because read/write head 127 was moving at a slower velocity during the writing thereof than during the writing of portions 520, 540. The slope of portion 560 is steeper than the slope of any portion 520, 540, 550 because read/write head 127 was moving at a slower velocity during the writing thereof than during the writing of portions 520, 540, 550.

While the foregoing is directed to embodiments of the present invention, other and further embodiments of the invention may be devised without departing from the basic scope thereof, and the scope thereof is determined by the claims that follow.

We claim:

1. A method of writing servo spirals on a disk surface, the method comprising:
   determining control parameters for controlling movement of a write head between a first radial location on the disk surface and a second radial location on the disk surface at a first velocity;
   while controlling movement of the write head between the first radial location on the disk surface and the second radial location on the disk surface at the first velocity according to the determined control parameters, writing a first spiral;
   while controlling movement of the write head between the first radial location on the disk surface and the second radial location on the disk surface at a second velocity that is different from the first velocity, based on timing and location information from the first spiral, writing a second spiral; and
   while controlling movement of the write head between the first radial location on the disk surface and the second radial location on the disk surface at the first velocity according to the determined control parameters and based on timing and location information from the second spiral, writing a third spiral.

2. The method of claim 1, wherein a magnitude of the first velocity is greater than that of the second velocity.

3. The method of claim 1, wherein a magnitude of the first velocity is twice that of the second velocity.

4. The method of claim 1, wherein a magnitude of the first velocity is an integer multiple of the second velocity.

5. The method of claim 1, further comprising:
while controlling movement of the write head between the first radial location on the disk surface and the second radial location on the disk surface at the first velocity according to the determined control parameters and based on timing and location information from the second spiral, writing a fourth spiral that is substantially equally angularly spaced from the third spiral, wherein the first, third, and fourth spirals are three of a plurality of guide spirals of a first set that are used as a position and timing reference when writing a second set of guide spirals which are finer than the plurality of guide spirals, which are used as a position and timing reference when writing a third set of spirals written subsequent to the first set and second set of spirals, which are used as a position and timing reference when writing servo sectors.

6. The method of claim 5, wherein the second set guide spirals are written as the write head is moved between the second radial location and the first radial location, and the third set of spirals are written as the write head is moved between the first radial location and the second radial location.

7. The method of claim 6, wherein the first set of guide spirals are evenly spaced from each other, the second set of guide spirals are evenly spaced from each other, and the third set of spirals are evenly spaced from each other.

8. The method of claim 1, wherein the first radial location is an inner diameter location on the disk surface and the second radial location is an outer diameter location on the disk surface.

9. The method of claim 1, wherein the control parameters are tuned based on measurements of a back electromotive force associated with moving the write head between the first radial location and the second radial location.

10. A data storage device comprising:
a rotatable disk with a writable surface; and
a controller configured to:
determine control parameters for controlling movement of a write head between a first radial location on the disk surface and a second radial location on the disk surface at a first velocity;
while controlling movement of the write head between the first radial location on the disk surface and the second radial location on the disk surface at the first velocity according to the determined control parameters, write a first spiral;
while controlling movement of the write head between the first radial location on the disk surface and the second radial location on the disk surface at a second velocity that is different from the first velocity, based on timing and location information from the first spiral, write a second spiral; and
while controlling movement of the write head between the first radial location on the disk surface and the second radial location on the disk surface at the first velocity according to the determined control parameters and based on timing and location information from the second spiral, write a third spiral.

11. The device of claim 10, wherein a magnitude of the first velocity is greater than that of the second velocity.

12. The device of claim 10, wherein a magnitude of the first velocity is twice that of the second velocity.

13. The device of claim 10, wherein a magnitude of the first velocity is an integer multiple of the second velocity.

14. The device of claim 10, wherein the controller is further configured to: while controlling movement of the write head between the first radial location on the disk surface and the second radial location on the disk surface at the first velocity according to the determined control parameters and based on timing and location information from the second spiral, write a fourth spiral that is parallel to the third spiral, wherein the first, third, and fourth spirals are three of a plurality of coarse guide spirals that are used as a position and timing reference when writing fine guide spirals, which are used as a position and timing reference when writing final spirals, which are used as a position and timing reference when writing servo sectors.

15. The device of claim 14, wherein the fine guide spirals are written as the write head is moved between the second radial location and the first radial location, and the final spirals are written as the write head is moved between the first radial location and the second radial location.

16. The device of claim 15, wherein the coarse guide spirals are evenly spaced from each other, the fine guide spirals are evenly spaced from each other, and the final spirals are evenly spaced from each other.

17. The device of claim 10, wherein the first radial location is an inner diameter location on the disk surface and the second radial location is an outer diameter location on the disk surface.

18. The device of claim 10, wherein the control parameters are control parameters that are tuned based on measurements of a back electromotive force associated with moving the write head between the first radial location and the second radial location.

19. A rotatable disk for a data storage device, comprising:
a data recording area extending from an inner diameter location to an outer diameter location; and
an unused recording area to the outside of the outer diameter location, the unused recording area including portions of spirals having at least four substantially different slopes written thereon.

20. The rotatable disk of claim 19, wherein the at least four substantially different slopes include first, second, third, and fourth slopes, respectively, and the unused recording area contains portions of only one spiral having the first slope.

* * * * *